United States Patent [19]

Brodie

[11] Patent Number: 4,591,520
[45] Date of Patent: May 27, 1986

[54] PRESSURE RELIEF DISC

[75] Inventor: George W. Brodie, Wellington, England

[73] Assignee: IMI Marston Limited, Wolverhampton, England

[21] Appl. No.: 455,020

[22] Filed: Jan. 4, 1983

[30] Foreign Application Priority Data

Jan. 2, 1982 [GB] United Kingdom ............... 8200008

[51] Int. Cl.⁴ .......................... B32B 1/00; B32B 9/00
[52] U.S. Cl. ...................................... 428/64; 428/66; 428/174; 428/428
[58] Field of Search ................... 428/64, 66, 408, 174

[56] References Cited

U.S. PATENT DOCUMENTS 3,404,061 10/1968 Shane et al. ...................... 428/408
4,234,638 11/1980 Yamazoe et al. ................. 428/408

FOREIGN PATENT DOCUMENTS 1099994 1/1968 United Kingdom .
1355486 6/1974 United Kingdom .
1444206 7/1976 United Kingdom .
1458931 12/1976 United Kingdom .
2051959A 1/1981 United Kingdom .

Primary Examiner—Paul J. Thibodeau
Attorney, Agent, or Firm—Cushman, Darby & Cushman

[57] ABSTRACT

A domed bursting disc adapted to be mounted in a holder and subject to pressure in which the disc is formed of flexible graphite. The flexible graphite may be used in a reverse buckling mode and may be backed by a metal disc. The disc is capable of operations over a wide range of temperatures and in non-oxidizing atmospheres can operate at temperatures up to 3,000° C.

8 Claims, 9 Drawing Figures

PRESSURE RELIEF DISC

BACKGROUND OF THE INVENTION

This invention relates to safety pressure relief apparatus and has particular, but not exclusive, reference to a reverse buckling pressure relief disc.

A reverse pressure relief disc as referred to in this specification has a central portion which is convex on one side and concave on the other. The disc is held between two annular members around an edge region of the disc, one of the members having a portion on the same side of the disc as the convex portion, and the other member having a portion on the same side of the disc as the concave portion. When in use as a reverse buckling pressure relief apparatus, incorporating a disc and support members, the disc is located upon a vessel with the convex side of the disc facing towards the interior of the vessel, so as to be in direct contact with the fluid contained within the vessel. When the fluid pressure within the vessel reaches a predetermined limit it causes the disc to reverse itself and, in one embodiment, to be released completely from the annular members.

Preferred forms of the metal disc are described in British Patent Specifications Nos. 1 355 486 and 1 444 206. The description of these specifications is incorporated herein by way of reference.

Such reverse buckling discs as are described in the above two specifications withstand the applied pressure by means of an annular abutment wall, forming part of one of the support members against which the disc is pressed by the pressure of fluid acting on the convex side of the disc. The significance of such an arrangement is that there is very little movement of the disc prior to its release when the pressure on the disc is above the predetermined limit. The disc is also continuous over its surface and does not have any score marks or other weakening zones which are present in some other types of reverse buckling discs.

Although the reverse buckling discs of the type described in the above two patent specifications are entirely suitable for many applications, the limitations which apply to any metal disc mean that they are unable to operate at very high temperatures in strongly oxidising atmospheres unless exotic and expensive metals are used.

It is also known to use flat, machined, graphite discs to withstand high temperatures and strongly oxidising atmospheres.

The graphite discs of the prior art have conventionally been manufactured by machining blocks of resin impregnated graphite to form the planar discs, see for example British Patent Specification No. 1 099 994.

In British Patent Specification No. 1 458 931 there is described a safety device for a sealed container which comprises a lamination of flat sheets of compressed expanded graphite material. The flat laminations are used as bursting discs.

A combination of a flat machined graphite disc and a flat graphite foil is disclosed in British Patent Specification No. 2 051 959A.

SUMMARY OF THE INVENTION

By the present invention there is provided a bursting disc adapted to be mounted in a holder and having a domed portion subject to pressure, characterised in that the domed portion is formed of flexible graphite.

The domed bursting disc may be adapted to be mounted in a holder so as, in use, to be subjected to higher pressure on its convex side.

The flexible graphite is preferably formed of exfoliated graphite. The exfoliated graphite may be pressed into the form of a domed disc. The pressing may preferably be carried out without the use of additional binders. The graphite may be exfoliated by boiling with concentrated sulphuric acid.

The flexible graphite disc may be backed on the side away from the pressure, preferably the concave side, by a metal disc. The edge of the graphite disc may be held between a pair of annular holders. The edge of the metal disc may be held between the pair of holders. The flexible graphite disc may be bonded to the metal disc by means of an adhesive. The metal disc may be held within the holders against a radial abutment wall. Radial expansion of the metal disc may be resisted by engagement of the periphery of the disc with the abutment wall.

The flexible graphite disc may be bonded to the holders or may be clamped permanently between the holders or may be so held between the holders as to be released upon reversal of the disc.

BRIEF DESCRIPTION OF THE DRAWINGS

By way of example embodiments of the present invention will now be described, with reference to the accompanying drawings, of which.

DESCRIPTION OF THE PREFERRED EMBODIMENTS

Where reference is made herein to flexible graphite sheets there is intended to mean material which is formed of graphite or principally of graphite but which is flexible rather than brittle as is conventional graphite. Flexible graphite sheets are available from Sigri Electrographit GmbH of D-8901, Meitingen bei Augsburg, West Germany, under the Registered Trade Mark "Sigraflex". The flexible graphite material is manufactured from thermally exfoliated graphite. The graphite is thermally exfoliated by boiling it with an intercalation compound such as concentrated sulphuric acid. This separates the hexagonal planes of the graphite one from the other. The thus exfoliated graphite is then either calandered into a flexible foil or may be pressed directly into shapes without the need to add any additional binder. Flexible graphite is resistant to temperatures in the range $-200°$ C. to $+500°$ C. in oxidising atmospheres and can withstand temperatures of up to $3000°$ C. in reducing or inert atmospheres. In the event that alternative methods of manufacturing flexible graphite are available these may also be used to manufacture the graphite discs of the present invention.

Figure 1:
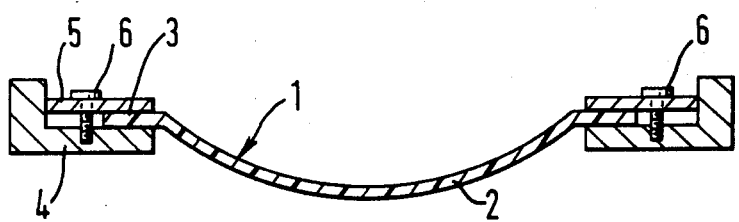
FIG. 1 is a cross-section of a disc and holder assembly in accordance with the present invention.

Referring to FIG. 1 this shows a flexible graphite reverse buckling disc 1 which has a central domed region 2 and a peripheral flange 3. The flange 3 is permanently clamped between a pair of annular support members 4 and 5. It will be seen that annular member 5 fits within member 4. The two flanges are then bolted together by means of bolts 6.

Figure 2:
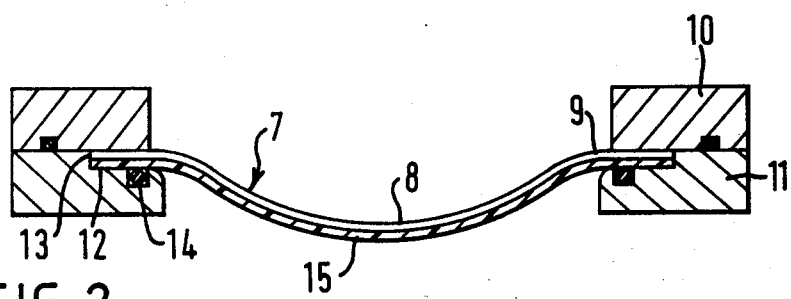
FIG. 2 is a cross-section of an alternative form of disc and holder assembly in accordance with the invention.

Referring to FIG. 2 this shows an alternative form of design in which a metal reverse buckling disc indicated generally by 7 has a central domed portion 8 and an outer peripheral edge region 9. The disc is normally of a circular plane shape. As is described in British Patent Specifications Nos. 1355486 and 1 444 206, the disc is held between a pair of holders 10 and 11. In the embodiment shown in FIG. 2 the holder 11 is formed with a step 12 and an outer abutment wall 13. The disc 8 locates onto the step 12 and contacts the wall 13. An O-ring 14 provides a seal between the disc and the holder 11 when the upper holder 10 is screwed onto the disc to force the disc firmly into contact with the O-ring. A series of screws (not shown) are used around the edge of the holder. The disc 7 is provided on its convex surface with a layer 15 of flexible Sigraflex (Registered Trade Mark) graphite. The graphite layer 15 has been formed initially to conform to the domed shape of the disc 7.

However, whereas the metal discs alone are not resistant to oxidising atmospheres at high temperature in the case of stainless steel discs, the graphite layer protects the stainless steel discs at temperatures up to 500° C. in an oxidising atmosphere such as air.

Figure 3:
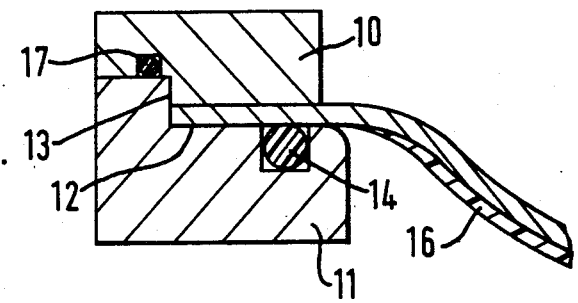
FIGS. 3 and 4 are cross-sections of further embodiments of the invention.

Referring to FIG. 3 this shows an alternative form of coating for the disc in which the graphite layer 16 only expands over that portion of the dome of the disc exposed to the oxidising atmosphere. In these circumstances an adhesive may be used to secure the graphite layer to the disc. As can be seen clearly in FIG. 3 a further O-ring 17 is used between the support member 10 and the support member 11. This O-ring prevents escape of any fluid above the disc to the exterior of the support member.

Figure 4:
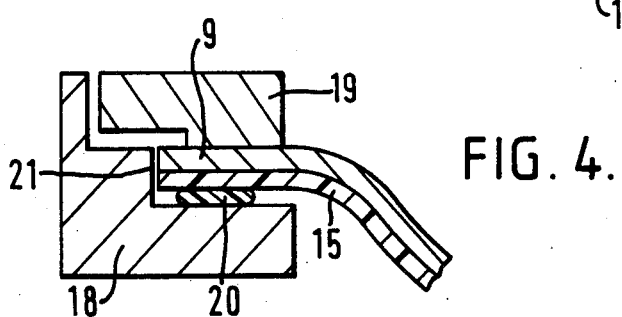

An alternative design of disc holder is shown in FIG. 4. In this case the support members 18 and 19 are clamped onto the disc and flexible graphite layer 9, 15 and a flat washer 20 is provided to seal the assembly. It is important with such an arrangement that the pressure of the support members 19 on the disc is accurately controlled by the use of accurately applied torque on the screws which hold the support member together. Again pressure is withstood by the disc by the edge of the disc 9 coming into contact with the wall 21 on the flange 18.

Figure 5:
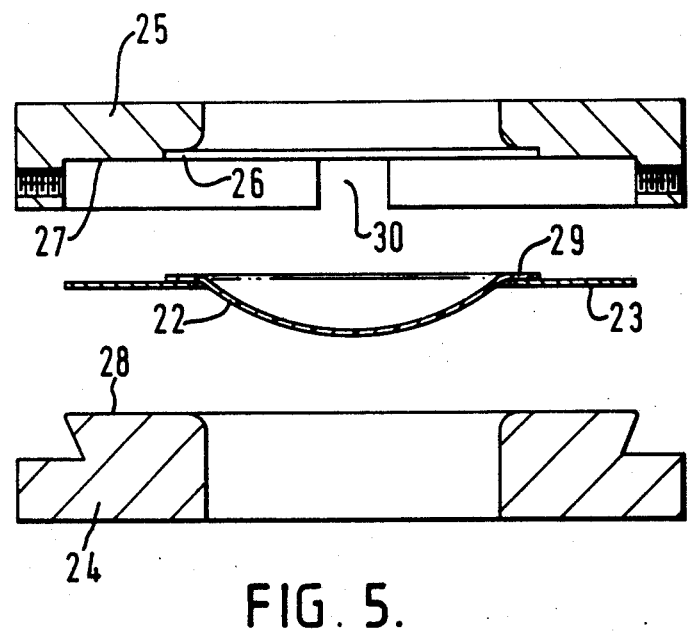
FIG. 5 is an exploded cross-section of an alternative embodiment of the present invention.

The design illustrated in FIG. 5 shows a flexible graphite disc 22 which is bonded to a gasket 23 by means of a suitable adhesive. The disc and gasket are located on a lower holder 24 and an upper holder 25 is positioned on top of the disc and flange assembly. The upper holder has a recess 26 having a depth slightly less than the thickness of the disc 22. Thus when the two flanges 25 and 24 are bolted together by suitable external bolts (not shown) the surfaces 27, 28 clamp onto the gasket 23 and the flange 29 of the disc 22 is held in the recess 26. The flange 29 is slightly compressed but is not damaged by the action of pressure. The bolts holding the assembly may, therefore, be tightened to any desired extent without damaging the disc or altering the relief pressure of the assembly. This means that the assembly is not sensitive to variation in torque of the assembled bolts.

The upper annular holder 25 has a relieved portion 30 through which a suitable tag attached to the gasket 23 may project. This tag will then identify the disc and may, if required, be located eccentrically on the disc and gasket assembly so as to permit the disc to be inserted only as shown in the drawings and not in an upside-down position.

Figure 6:
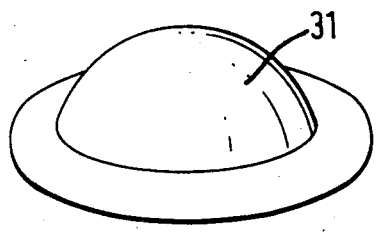
FIG. 6 is a perspective view of a disc in accordance with the invention.
Figure 7:
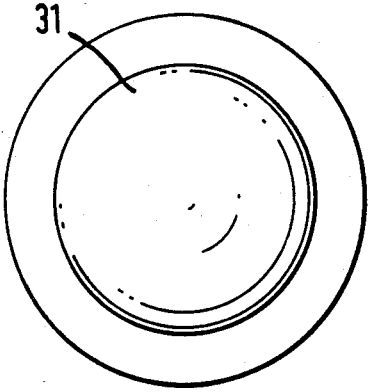
FIG. 7 is a plan view of the disc of FIG. 5.
Figure 8:
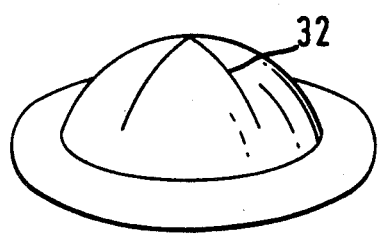
FIG. 8 is a perspective view of a scored reverse buckling support disc.
Figure 9:
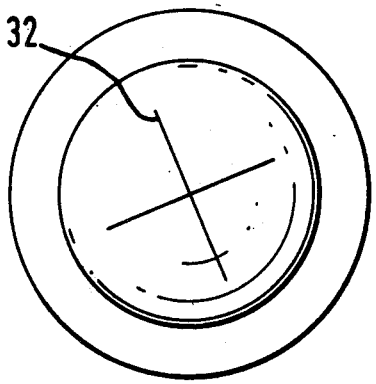
FIG. 9 is a plan view of the disc of FIG. 8.

As can be seen in FIGS. 6 and 7 the dome region 31 of a metal disc suitable for incorporation in the present invention is continuous and smooth. The graphite is, therefore, perfectly supported over the entire surface of the disc and there are no sharp edges which could otherwise adversely tear the graphite layer. It may be possible, however, to use discs of the type illustrated in FIGS. 8 and 9 which are scored discs having score lines 32. Preferably the disc is scored on the side away from the graphite dome.

The use of the graphite dome to back a metal disc extends the operating temperatures of metal discs when in corrosive atmospheres. As the flexible graphite is not porous and normally contains no resins it is resistant to highly corrosive or oxidising atmospheres and is easily made. It thus enables graphite backed metal discs to be used in place of machined flat impregnated discs.

Although it might have been thought that a flexible graphite disc would have little strength in its own right and would have to be backed by a metal disc, it has now very unexpectedly been found that such flexible graphite discs can withstand very high operating pressures and relieve at predictable levels of pressure. Furthermore, when in the reverse buckling mode they may be operated within 90% of their relief pressure. By comparison flat flexible graphite discs are limited to an operating pressure believed to be about half of the burst pressure.

Experimentally it has been found that discs of 51 mm nominal bore size shaped as illustrated in FIG. 1 can be made with thicknesses between 0.15 mm and 1.5 mm and these give burst pressures between $20 \times 10^{-2}$ atmospheres and 6.8 atmospheres respectively. If the burst pressure at ambient temperature is taken as 100%, there is a reduction of 15%, to 85%, at 200° C., a reduction of 17%, to 83%, at 400° C. and a reduction of 23%, to 77%, at 600° C. A 100 mm disc would have a burst pressure at 0.15 mm thickness of about $6.8 \times 10^{-2}$ atmospheres. Obviously other thicknesses could be used.

In a series of tests in the reverse buckling mode on 50 mm nominal bore flexible graphite discs without any metal backing the following results where obtained:

| Density (g/m$^2$) | Thickness (mm) | Burst Pressure (Bar) |
| --- | --- | --- |
| 1.70 | 0.95 | 1.35 |
| 1.75 | 0.90 | 1.70 |
| 1.80 | 0.85 | 1.70 |

Where the graphite discs are used without the backing of a metal member the graphite is so effectively destroyed on the bursting of the disc that no special arrangements are necessary to capture the small quantities of graphite. However, where metal discs are used to back the graphite disc the preferred discs are those illustrated in FIGS. 2, 3, 4, 6 and 7. With such disc designs the metal discs are released completely from their holder on reversal.

Such arrangements are fully described in the two British patent specifications referred to above. When the metal discs are released from their holders the graphite discs follow and may either by expelled or may be caught on a suitable bar stretched across the vent pipe downstream of the disc assembly.

The main types of reverse buckling discs which could be used with the graphite layer to produce a product in accordance with the present invention are as follows. A cruciform knife-blade or three-blade type in which the disc reverses onto the cruciform knife-blade. A single edge cutter device in which the disc reverses onto the edge. A scored type disc of the type illustrated in FIGS. 8 and 9 (which may be concave side to the higher pressure). A blow-out disc in which the disc is welded into the holder or otherwise secured firmly in the holder (which again may be concave side to the higher pressure). Preferably, in the case of scored discs the scores are provided in the face remote from the graphite layer so that the face of the disc opposing the pressure and in contact with the graphite is smooth.

The reverse buckling bursting disc assembly, where the graphite disc exposes its convex side to the pressure, puts the flexible graphite disc into compression, which appears to significantly affect the ability of the material to resist pressure. The flexible graphite discs can be made by a simple pressing operation direct to a pre-domed shape. In addition to withstanding pulsating pressures to a maximum of 90% of the burst pressure, bursting tolerances are small, about ±5%. The discs will take ±10% of the specified burst pressure on the vent, or concave side. This means that the discs fail safe if inserted the wrong way round and furthermore can take a full vacuum at specified pressures of 1.2 bar plus.

With the design of the present invention, which utilises a metal backing disc, the bursting disc will sustain a maximum working load of 95% of the burst pressure. Bursting tolerances are ±5% at pressures of 2 bar and over. Again the reverse buckling discs fail safe if inserted the wrong way round, with the concave side towards the pressure, the disc being pushed from its holder by the pressure on the concave side.

In oxidising media the discs can easily withstand 350° C. and temperatures in oxidising atmospheres of from −200° C. to 500° C. can be withstood. With the un-backed flexible graphite disc, and with inert gases, the temperature capability is 3000° C. maximum.

It will be appreciated that hitherto graphite discs have always been flat unless machined with great difficulty from the solid. The only domed discs hitherto have always been manufactured from metal. For the first time, therefore, the invention has provided a domed graphite disc which may be simply manufactured by pressing exfoliated graphite. It will be appreciated that with conventional graphite discs they are impregnated with a resin which has a serious effect on their ability to operate at elevated temperatures. However, by using flexible graphite discs in accordance with the present invention they may be used in the unimpregnated state whilst still being impervious and being able to operate at high temperatures. The discs may be easily fabricated.

I claim:

1. A bursting disc adapted to be mounted in a holder having a domed portion subject to pressure, characterised in that the domed portion is formed of flexible molded exfoliated graphite 2. A bursting disc as claimed in claim 1 further characterised in that it is adapted to be mounted in a reverse buckling mode in a holder so as, in use, to be subjected to pressure on its convex side.

3. A reverse buckling disc as claimed in claim 2 in which the disc is backed on its concave side by a metal disc.

4. A reverse buckling disc as claimed in claim 2 in which the flexible graphite disc is formed by pressing exfoliated graphite, the graphite having been exfoliated by boiling with an intercalation compound, such as concentrated sulphuric acid.

5. A reverse buckling disc as claimed in claim 3 in which the edge of the metal disc and the edge of the graphite are held between a pair of annular holders.

6. A reverse buckling disc as claimed in claim 3 in which the flexible graphite disc is bonded to the metal disc.

7. A reverse buckling disc as claimed in claim 3 in which the metal disc is held within the holders against a radial abutment wall.

8. A reverse buckling disc as claimed in claim 2 in which the edge of the flexible graphite disc is clamped permanently between pair of annular holders, and the dome of the disc disintegrates on reversing.

* * * * *